United States Patent
Wu

(10) Patent No.: US 7,256,689 B2
(45) Date of Patent: Aug. 14, 2007

(54) FLASHING DEVICE FOR VEHICLE

(76) Inventor: Tsung Min Wu, No. 11, Lane 181, Sec. 3, Hai-An Road, Tainan City (TW)

( * ) Notice: Subject to any disclaimer, the term of this patent is extended or adjusted under 35 U.S.C. 154(b) by 85 days.

(21) Appl. No.: 10/863,468

(22) Filed: Jun. 9, 2004

(65) Prior Publication Data

US 2005/0275523 A1    Dec. 15, 2005

(51) Int. Cl.
*B60Q 1/52* (2006.01)
(52) U.S. Cl. ............. 340/471; 340/815.45; 315/200 A; 315/291; 315/307
(58) Field of Classification Search ................ 340/471, 340/468, 478, 815.45; 318/200, 291, 307, 318/76, 77, 78, 200 A, 82
See application file for complete search history.

(56) References Cited

U.S. PATENT DOCUMENTS

| 4,005,335 | A | * | 1/1977 | Perper ........................ 315/224 |
| 4,634,957 | A | * | 1/1987 | Hollaway ................... 323/242 |
| 5,132,659 | A | * | 7/1992 | Kuo ........................... 340/326 |
| 5,705,975 | A | * | 1/1998 | Serino et al. .......... 340/426.34 |

\* cited by examiner

*Primary Examiner*—Jeffery Hofsass
*Assistant Examiner*—Edny Labbees
(74) *Attorney, Agent, or Firm*—Rosenberg, Klein & Lee

(57) ABSTRACT

A flashing device for a vehicle includes a power filtering unit connected to a power source for outputting a negative voltage after filtration, a detecting unit for detecting the negative voltage from the power filtering unit, an oscillating unit electrically connected to the detecting unit, and a drive unit electrically connected to the detecting unit and the oscillating unit. The oscillating unit generates a flashing signal when the detecting unit detects the negative voltage. The drive unit receives the flashing signal and causes the flashing device to flash.

6 Claims, 2 Drawing Sheets

FLASHING DEVICE FOR VEHICLE

BACKGROUND OF THE INVENTION

1. Field of the Invention

The present invention relates to a flashing device for a vehicle. In particular, the present invention relates to a flashing device that can be used with lamps and light-emitting diodes.

2. Description of the Related Art

A typical conventional flashing device for a vehicle uses a lamp and a flashing circuit that is alternately open and closed to provide the required flashing effect of the lamp. Flashing devices using light-emitting diodes (LEDs) have been developed to provide softer lights while saving electricity. However, the power for lighting lamps is different from that for the LEDs such that the flashing circuit for lamps will cause overload of the LEDs.

SUMMARY OF THE INVENTION

An object of the present invention is to provide a flashing device that can be used not with only a lamp but also LEDs.

In accordance with an aspect of the present invention, a flashing device for a vehicle includes a power filtering unit connected to a power source for outputting a negative voltage after filtration, a detecting unit for detecting the negative voltage from the power filtering unit, an oscillating unit electrically connected to the detecting unit, and a drive unit electrically connected to the detecting unit and the oscillating unit. The oscillating unit generates a flashing signal when the detecting unit detects the negative voltage. The drive unit receives the flashing signal and causes the flashing device to flash.

In an embodiment of the invention, the power filtering unit includes a plurality of capacitors. The detecting unit includes two comparators, a capacitor, two resistors, and a transistor. The oscillating unit includes two comparators, a capacitor, and a plurality of resistors. The oscillating unit has a frequency between 70 and 90 Hz. The drive unit includes a relay, a plurality of resistors, a plurality of transistors, and a plurality of diodes.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
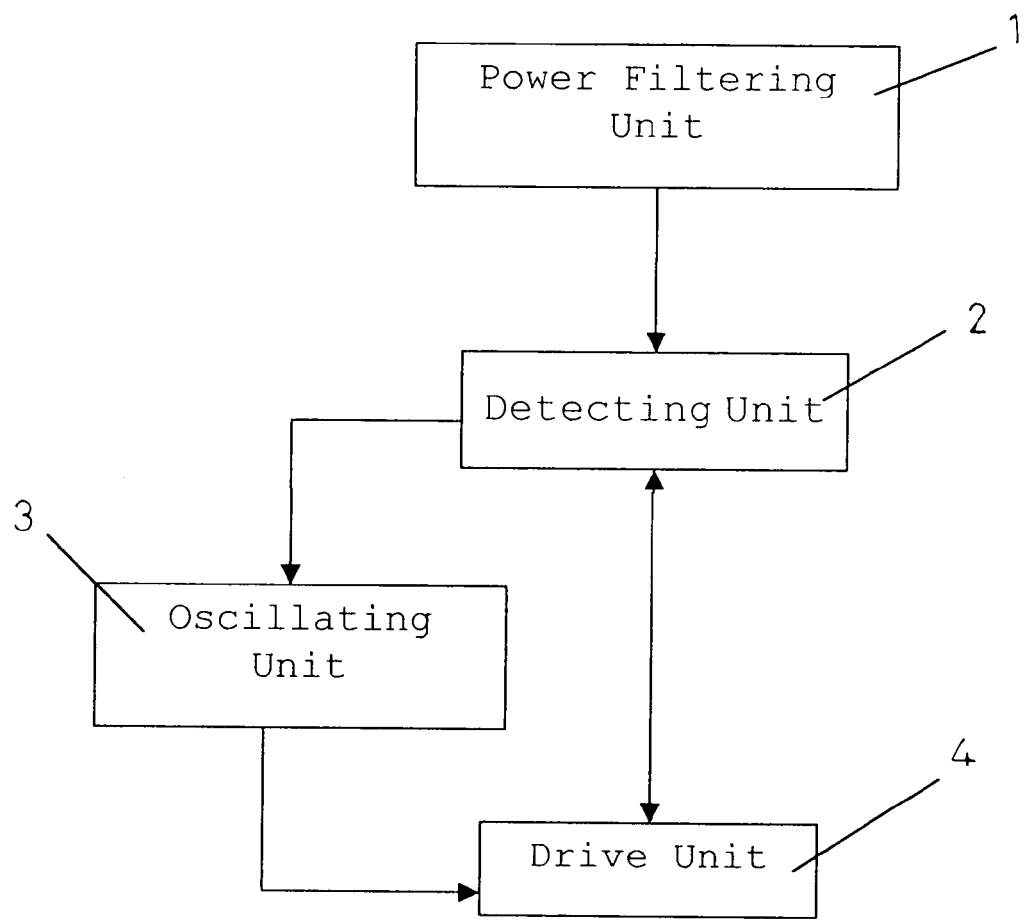
FIG. 1 is a block diagram of a flashing device in accordance with the present invention.
Figure 2:
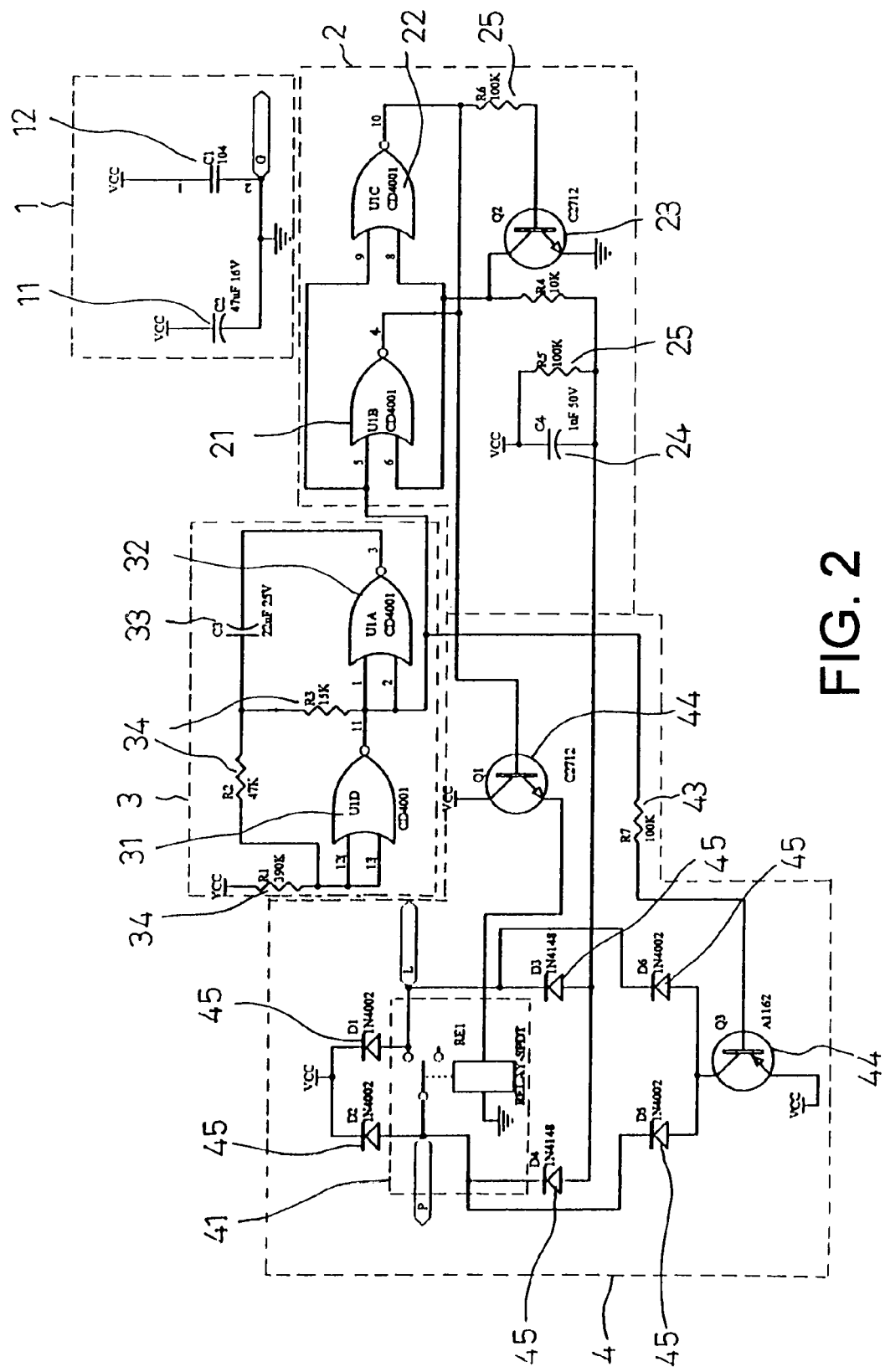
FIG. 2 is a circuitry diagram of the flashing device in accordance with the present invention.

Referring to FIGS. 1 and 2, a flashing device for a vehicle in accordance with the present invention comprises a power filtering unit 1, a detecting unit 2, an oscillating unit 3, and a drive unit 4. The power filtering unit 1, the detecting unit 2, the oscillating unit 3, and the drive unit 4 are mounted on a circuit board.

The power filtering unit 1 is connected to a power source VCC and includes a plurality of capacitors 11 and 12. The function of the power filtering unit 1 is outputting a voltage after filtration of waves.

The function of the detecting unit 2 is to detect a negative voltage outputted by the power filtering unit 1. The detecting unit 2 includes two comparators 21 and 22, a capacitor 24, two resistors 25, and a transistor 23.

The oscillating unit 3 is electrically connected to the detecting unit 2. When a negative voltage is detected by the detecting unit 2, the oscillating unit 3 generates a flashing signal. The oscillating unit 3 includes two comparators 31 and 32, a capacitor 33, and a plurality of resistors 34. The oscillating unit 3 has a frequency between 70 and 90 Hz.

The drive unit 4 is electrically connected to the detecting unit 2 and the oscillating unit 3 for receiving the flashing signal from the oscillating unit 3 and for causing the flashing device to flash. The drive unit 4 includes a relay 41, a plurality of resistors 43, a plurality of transistors 44, and a plurality of diodes 45.

The flashing device can be used with a lamp or a plurality of diodes acting as the light source. When a negative voltage is detected by the detecting unit 2, the oscillating unit 3 generates a flashing signal to cause the transistors 44 and the relay 41 of the drive unit 4 to proceed with flashing action. The message containing the flashing action is transmitted to the lamp or diodes, causing the lamp or diodes to flash. When the negative voltage is stopped, the detecting unit 2 deactivates oscillation of the oscillating unit 3, which, in turn, deactivates the transistors 44 of the drive unit 4. Thus, the relay 41 stops the flashing action, which, in turn, stops flashing of the lamp or the diodes.

A negative voltage is created whenever the light source (the lamp or LEDs) is connected to the power source, as the light source itself is a load to electricity. Thus, a lamp or LEDs can be used as the flashing light source in accordance with the present invention.

Although the invention has been explained in relation to its preferred embodiment, it is to be understood that many other possible modifications and variations can be made without departing from the scope of the invention as hereinafter claimed.

What is claimed is:

1. A flashing device for a vehicle, comprising:
    a power filtering unit connected to a power source for outputting a negative voltage after filtration responsive to a signal lamp being connected to the power source;
    a detecting unit coupled to the power filtering unit for detecting the negative voltage from the power filtering unit;
    an oscillating unit electrically connected to the detecting unit, the oscillating unit generating a flashing signal responsive to the negative voltage being detected by the detecting unit; and
    a drive unit electrically connected to the detecting unit and the oscillating unit, the drive unit having a relay with contacts coupled to the signal lamp, the drive unit receiving the flashing signal and switching the relay in correspondence thereto for making and breaking the contacts of the relay to flash the signal lamp.

2. The flashing device for a vehicle as claimed in claim 1, wherein the power filtering unit includes a plurality of capacitors.

3. The flashing device for a vehicle as claimed in claim 1, wherein the detecting unit includes two comparators, a capacitor, two resistors, and a transistor.

4. The flashing device for a vehicle as claimed in claim 1, wherein the oscillating unit includes two comparators, a capacitor, and a plurality of resistors.

5. The flashing device for a vehicle as claimed in claim 1, wherein the oscillating unit has a frequency between 70 and 90 Hz.

6. The flashing device for a vehicle as claimed in claim 1, wherein the drive unit further includes a plurality of resistors, a plurality of transistors, and a plurality of diodes.

* * * * *